Figure 7:
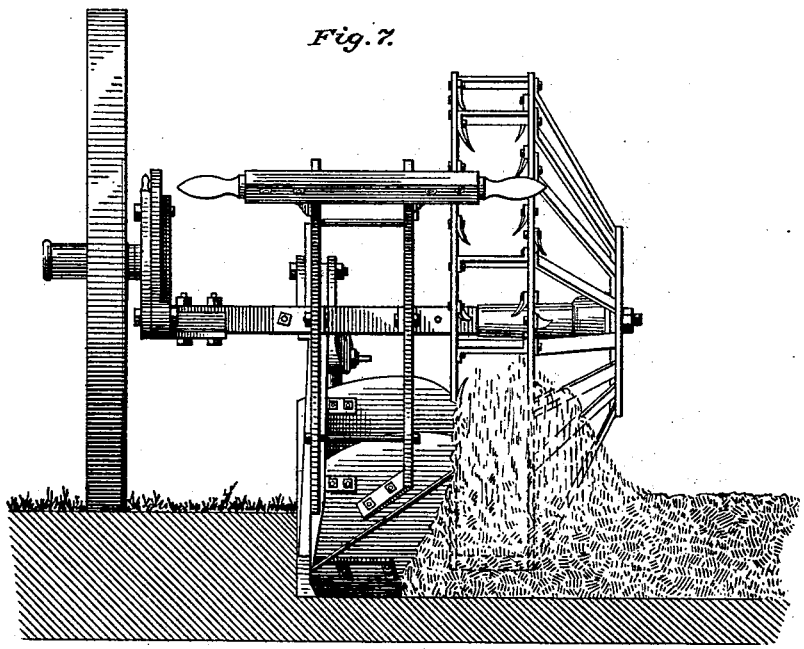

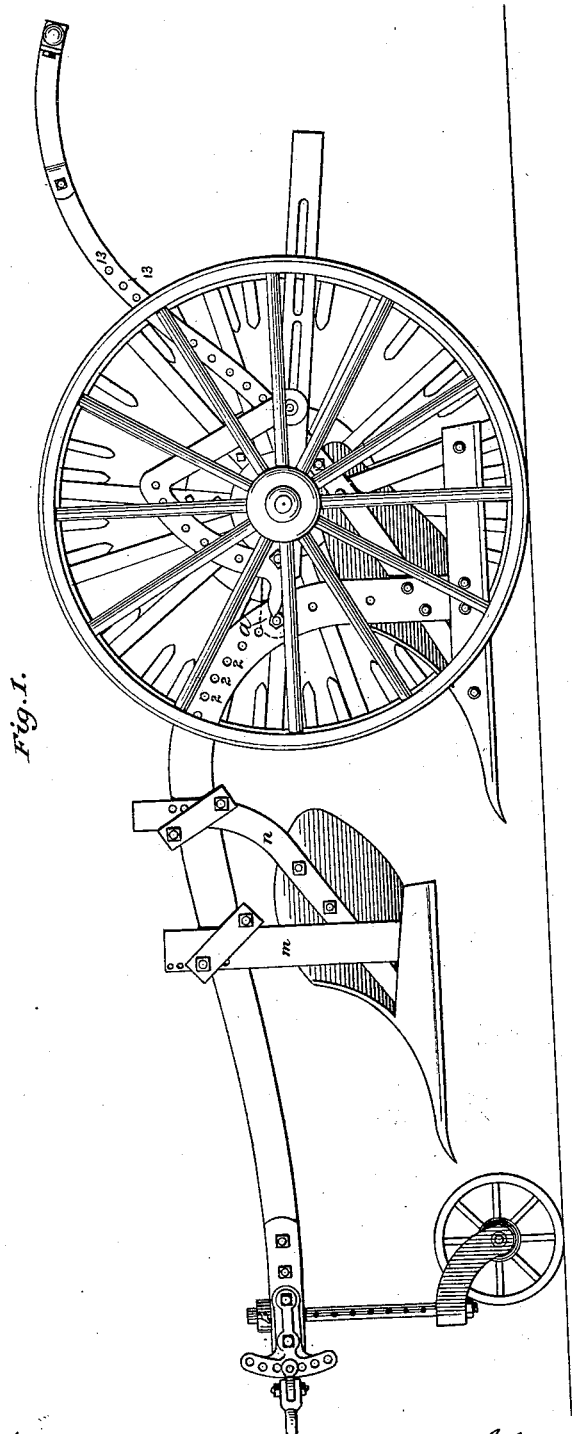

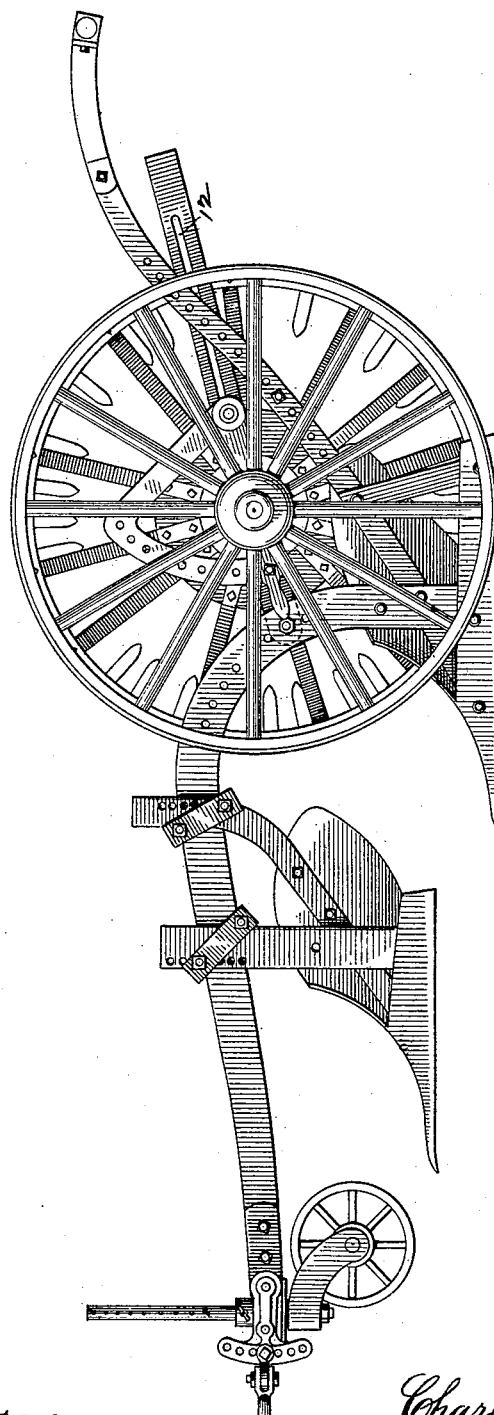

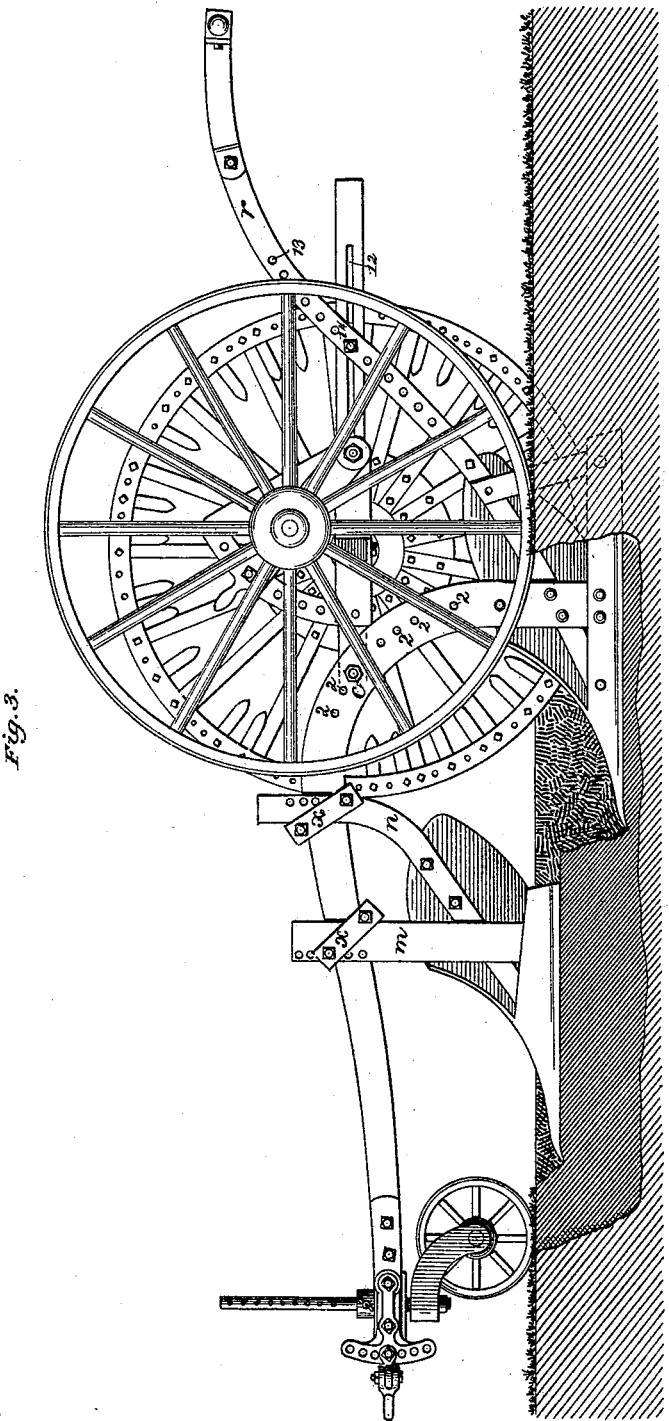

(No Model.)
8 Sheets—Sheet 4.
C. E. SACKETT.
Combined Plow and Pulverizing Apparatus.
No. 233,809. Patented Oct. 26, 1880.
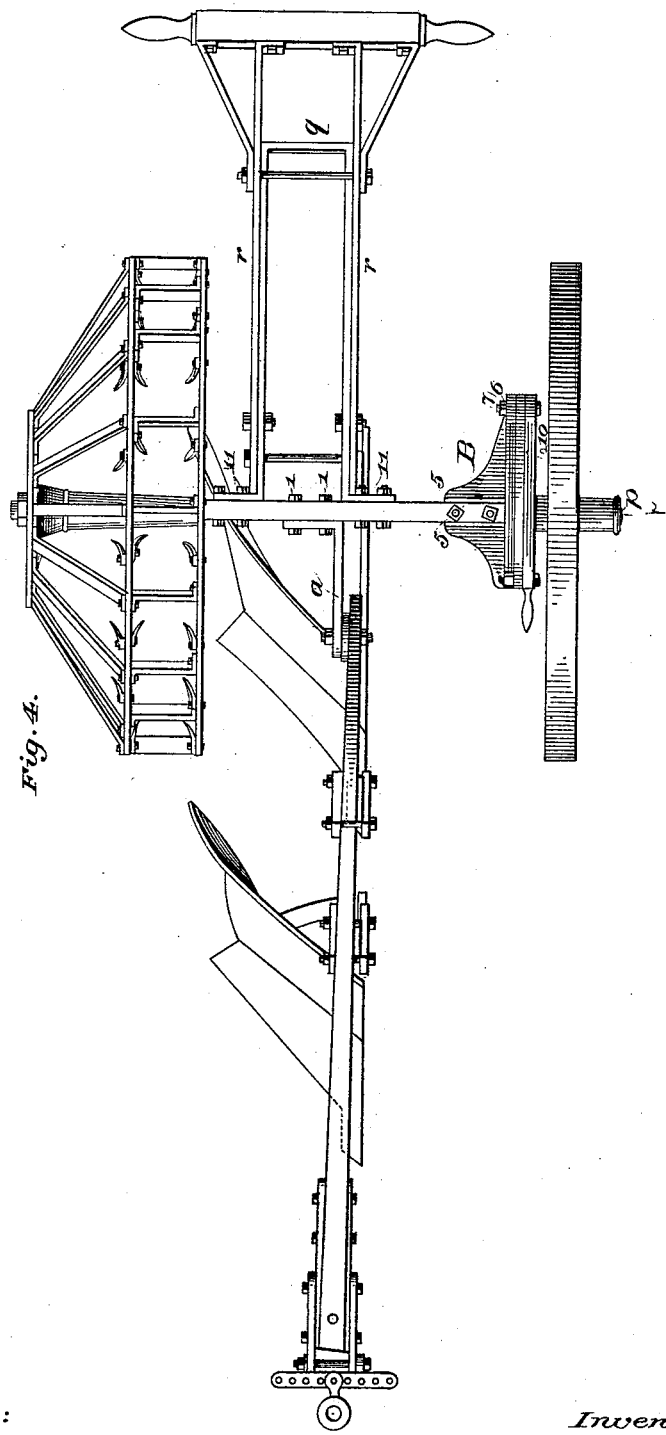
Attest:
R. F. Barnes.
L. Warren Seely.
Inventor:
Charles E. Sackett.
by Ellis Spear
Attorney.

(No Model.)       8 Sheets—Sheet 5.
C. E. SACKETT.
Combined Plow and Pulverizing Apparatus.
No. 233,809.        Patented Oct. 26, 1880.
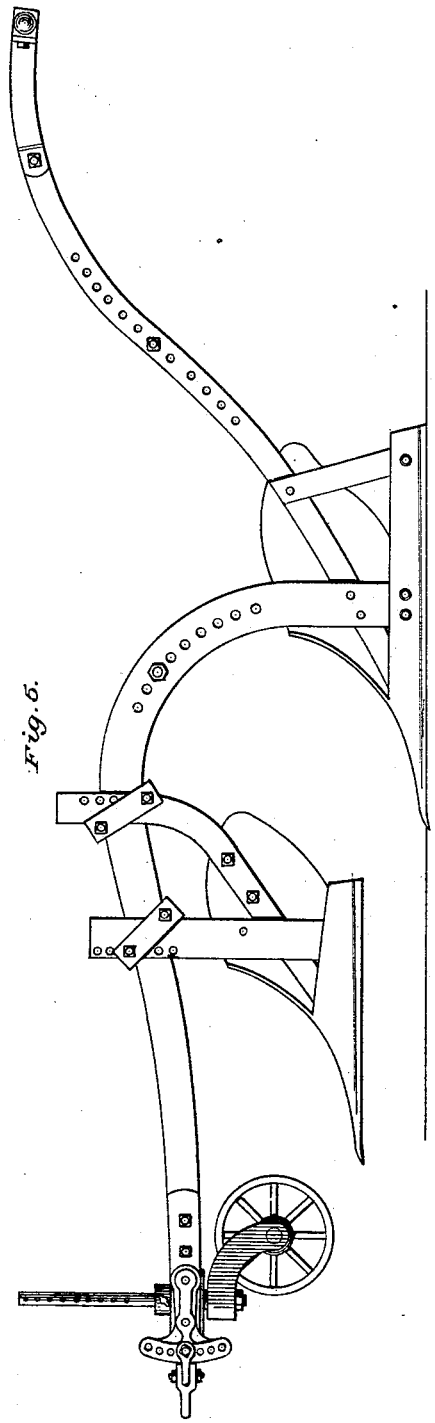
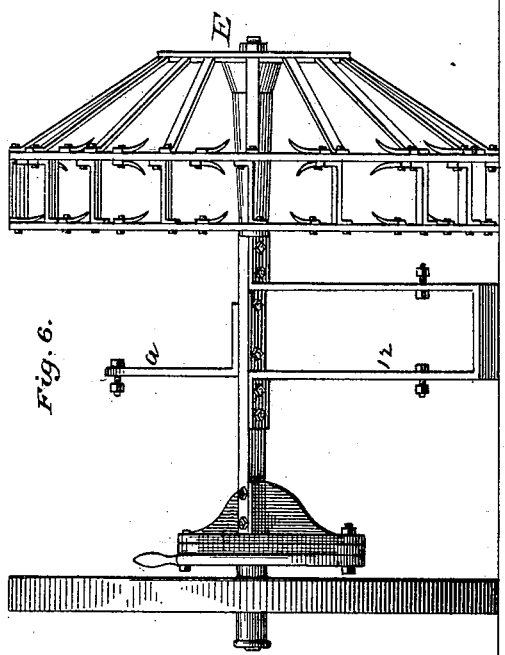
Attest:
R. A. Barnes.
L. Warren Seely.
Inventor:
Charles E. Sackett
by Ellis Spear
Attorney (No Model.)   8 Sheets—Sheet 6.

C. E. SACKETT.
Combined Plow and Pulverizing Apparatus.
No. 233,809.   Patented Oct. 26, 1880.

Attest:
R. P. Barnes.
Warren Seely.

Inventor:
Charles E. Sackett,
by Ellis Spear
Attorney.

(No Model.) 8 Sheets—Sheet 7.
C. E. SACKETT.
Combined Plow and Pulverizing Apparatus.
No. 233,809. Patented Oct. 26, 1880.
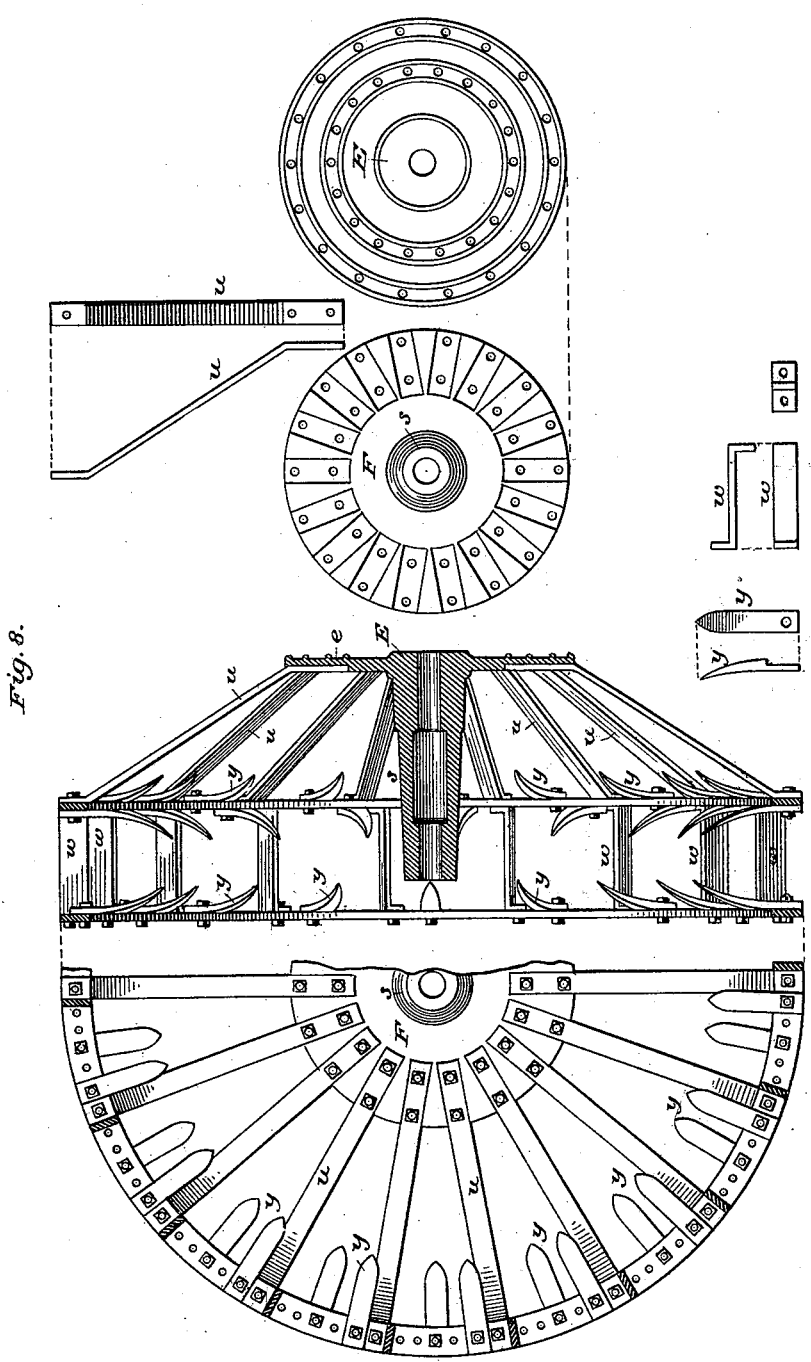

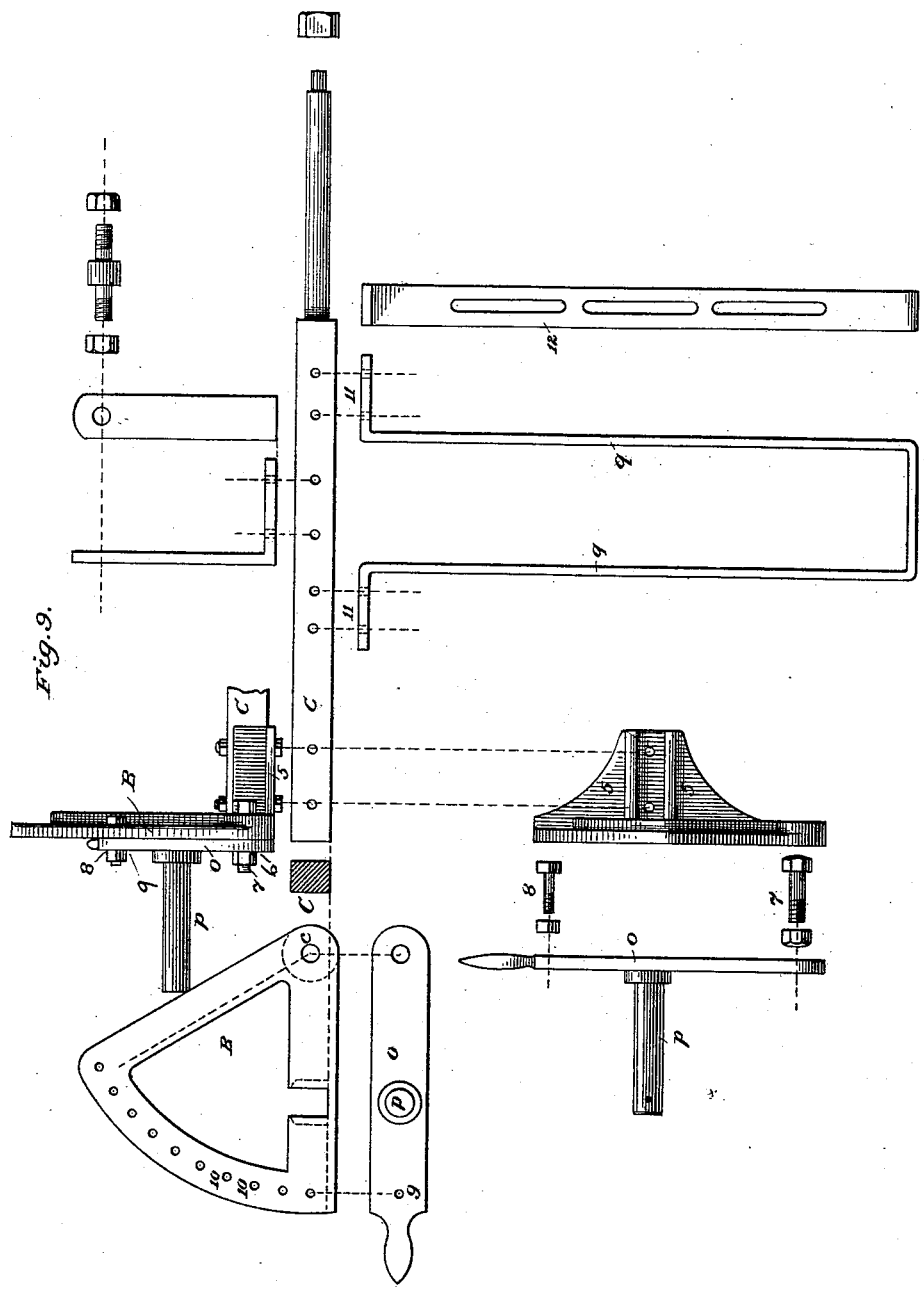

UNITED STATES PATENT OFFICE.

CHARLES E. SACKETT, OF MATILDA FURNACE, PENNSYLVANIA.

COMBINED PLOW AND PULVERIZING APPARATUS.

SPECIFICATION forming part of Letters Patent No. 233,809, dated October 26, 1880.

Application filed July 20, 1880. (No model.)

*To all whom it may concern:*

Be it known that I, CHARLES E. SACKETT, of Matilda Furnace, in the county of Mifflin and State of Pennsylvania, have invented a new and useful Improvement in Combined Plow and Pulverizing Apparatus; and I do hereby declare that the following is a full, clear, and exact description of the same.

My invention is an improvement upon the combined plow and harrow for which Letters Patent of the United States were granted me on the 16th day of December, 1879, and numbered 222,603, and also on the 30th day of September, 1879, and numbered 220,176 and 220,177.

The leading feature of the said invention was a combined plow and revolving harrow in which the furrow was turned immediately into the harrow and pulverized, mixed with air, and left loose in place at one operation.

The object of my present invention is to simplify the details, and thereby to gain certain great advantages, both in construction and in the operation of the apparatus.

In the drawings hereunto attached, Figure 1 represents an elevation, on the wheel side, of the combined plow and harrow with the plow raised for road transportation. Fig. 2 is an elevation, on the wheel side, of the apparatus with the plow lowered ready to begin its work. Fig. 3 represents a like elevation of the plow at work, with the furrow in section. Fig. 4 is a top view of the apparatus. Figs. 5 and 6 represent the plow detached, the plow being shown in Fig. 5 in side elevation, and the wheel and harrow with connecting devices in rear elevation. Fig. 7 is a rear view of the apparatus at work. Fig. 8 represents details of the harrowing-wheel, and Fig 9 details of the beam-lever, axle, hand-lever, wheel-casting, spindle, &c.

The first seven figures above indicated are drawn on a smaller scale, and the details shown in Figs. 8 and 9 are represented on a larger scale, for clearness of illustration.

In the form of plow and beam adopted in my present improvements I prefer to use that of the shape shown specially in the side elevations of the first three figures, the plow having the curved iron beam.

For the purpose of attaining the very desirable object of readiness of attachment to, and detachment from, the pulverizing mechanism, and at the same time to secure a proper line of draft from the plow to the pulverizer and secure a flexible connection, I have bolted the plow-beam at one point to an arm fixed upon the front of the axle. This arm is represented at *a*, the rear end bent at right angles, being secured to the axle by bolts 1 1. The front end is provided with a bolt-hole, which may be made to register with any one of a series of holes, 2 2, in the plow-beam, a single bolt, *c*, passing through arm and beam, securing the parts together. This also gives the proper pivotal connection of the plow to the axle, necessary in raising and lowering, and a simple and direct forward draft from plow to pulverizing apparatus.

The mode of connecting the forward plow to the beam is also materially changed. Instead of the vertical post and the horizontal brace bolted thereto I have provided a vertical post, *m*, bolted to the landside, and a bent inclined brace, *n*, bolted to the mold-board. The brace *n* is bent laterally to bring the upper end into line with the upper end of the vertical post, so as to furnish a rigid connection with the beam. Both are perforated with a series of holes for adjustable connection with the beam to which they are held by clamps *x x*, the bolts of which clasp the beam and pass on one side through a hole in the post or brace. This construction affords a secure and simple connection to the beam, and also braces the landside and mold-board of the plow, which, for the work required of it, need not be very heavy.

The apparatus is further improved by substituting for the gage-wheel and straight axle, as shown in Fig. 4 of Patent 222,603 a wheel of the same size as the pulverizing-wheel, and in making provision therewith for raising or lowering the said wheel in relation to the axle. This adjustment is accomplished by mechanism shown in Figs. 1, 2, and 5, but more clearly in the detail views, and on a larger scale in Fig. 9. A segment-casting, B, is bolted upon the end of the straight axle C by means of check-pieces 5 5. At the point 6 on this segment-casting is pivoted a handle-lever, *o*, to which is fixed the wheel-spindle *p* at such a point that it may be brought in line with the main axle. A bolt, 7, secures the lever to the segment at the point 6, and serves as the fulcrum, while another bolt, 8, is fitted to the hole 9 in the other end of the lever, and serves to hold the lever in position at any one of the holes 10 in the curved arm of the segment. The position of the lever upon the segment determines the elevation of the wheel above the pulverizer-wheel, and consequently the depth of the furrow, it being understood that the pulverizer-wheel runs in the furrow last made, while the other wheel runs upon the land. This construction enables the user to drive the plow readily from place to place with greater facility, while it may be adjusted to regulate the depth of plowing by the change of a single bolt.

Further adjustment to raise the plow above the surface when it is to be transported is provided in mechanisms shown in the side elevations and plan view No. 4, and more clearly in the enlarged detail views in Fig. 9.

A double arm, q, formed of a single bent bar, is bolted through outwardly-turned ends to the rear side of the axle, as shown clearly at 11 11, Fig. 9. This lever passes between the handles r r, as shown in the side elevations, and in the plan view of Fig. 4. Each side of the arm is provided with a series of short slots, 12 12, which, as the arm is raised or lowered, may register successively with holes 13 13 in the handles r.

It will be apparent that the arm a forms, with the double arm q, a complete lever of the first order, the weight of which is the plow suspended at the forward end, and the fulcrum of which is the axle. The arm q q being depressed, the plow is raised above the surface for transportation. It is held in position by means of bolts 14 14, passing through the slots in the arms and holes in the handles.

The pulverizing-wheel is very materially improved over the form shown in my former patents, both in form and in the details of construction. In these patents the wheel is represented as a plain cylinder with plain periphery. I have found that a better effect may be obtained by making the tread narrower and the outer or furrow side of the wheel in the form of a truncated cone, greatly flattened. This form allows the wheel to cut well down to the bottom of the furrow, and sifts out the earth of the pulverized furrow and causes it to fall on a slope, thus obliterating all traces of the furrow and leaving the land as smooth as if harrowed in the ordinary way.

The wheel is built upon a strong casting, E, which consists of a hub, s, and flange t. The flange is preferably cast with radial recesses 15 15, Fig. 9, to receive the inclined bars u, which are bolted thereto or may be dovetailed therein, and extend radially to the rim v. The tread of the wheel is formed of the two rims, v and v' and the cross-bars w. These cross-bars are formed with ends turned at right angles to give bearings against the inner surfaces of the rims to which they are bolted. Sets of these cross-bars may be provided of different lengths, so that the tread may be made wide or narrow, according to the width of the furrow.

In the present construction the teeth are connected to the rims by bolts and nuts. They are of the form shown at y, curved inwardly or outwardly to the wheel from the landside rim, and in both directions on the inner rims, in order to catch and tear or break the earth at all points. The rims are provided with a number of holes in excess of the number of teeth ordinarily required, so that the number of teeth, they being easily removable, may be increased or diminished, as also the cross-bars w, which, by their width apart, regulate the fineness of the pulverization, or in stiff land the power required to effect it, or in stony land the sizes of stone that will safely pass through.

The described construction of the wheel makes it convenient to construct it of bar-iron or steel, and consequently light and strong.

It is manifest from the construction described that the plow may be readily detached and used as an ordinary plow for opening the first furrow or for ordinary use without the pulverizer.

Having thus described my invention, what I claim as new is—

1. The pulverizing-wheel adapted to operate in connection with a plow to receive the furrow-slice therefrom, said wheel having a cylindrical tread and frusto-conical furrow side, substantially as described.

2. The combination, in a pulverizing-wheel, of the hub-casting F, inclined radial bars u, rims v v', and transverse bars w, substantially as described and shown.

3. In a combined plowing and pulverizing apparatus in which the furrow-slice is turned into the pulverizer, the combination of a pulverizing-wheel, a straight axle, a landside wheel of the same size as the pulverizing-wheel, and adjustably attached to the axle, substantially as described.

4. The combination of the axle, the arm a fixed directly to said axle, the plow, and a suitable elevating-arm, substantially as described.

5. The combination of the plow, the arm a, fixed directly to said axle, the axle, and the double arm r r, substantially as shown and described.

6. The combination, with the plow-arm a and axle, of the slotted arms r r, perforated handles, and connecting-bolts, as described.

7. The combination, in a combined plow and wheel-pulverizer, of a straight axle and a landside wheel with the segment-casting B, lever o, wheel-spindle p, and the described wheel-pulverizer of the same diameter as the landside wheel, substantially as described and shown.

In testimony whereof I have signed my name to this specification in the presence of two subscribing witnesses.

CHAS. E. SACKETT.

Witnesses:
STATES M. SACKETT,
WM. A. SCHUTT.